Patented June 9, 1953

2,641,547

UNITED STATES PATENT OFFICE 2,641,547

FLAVORING COMPOSITION

James W. Evans, Highland, Ind., assignor to General Mills, Inc., a corporation of Delaware No Drawing. Application November 27, 1950,
Serial No. 197,846

4 Claims. (Cl. 99—140)

The present invention relates to a flavoring composition containing fat and seasoning ingredients, and more particularly it relates to such a flavoring composition particularly adapted for use in soups.

Many seasoning compositions contain fat in addition to the usual seasoning ingredients, such as salt, spices, and the like. Typical of these seasoning compositions is one employed in dehydrated soup mixes. For example, in a chicken-flavored type of soup mix, it is customary to employ some chicken fat since the chicken fat appears to contain the principal flavor constituents of the chicken. The chicken fat is frequently mixed with dry solid flavoring ingredients in the form of a separate mix from the remaining ingredients of the soup mix. The fat content of these seasoning mixes may be quite high, thereby giving the mix a greasy feel or appearance. This is not only unsightly in the finished product, but also presents certain packaging difficulties. These flavoring compositions are usually weighed or measured by automatic equipment which requires a free-flowing material. These greasy flavoring compositions are extremely difficult to handle in automatic packaging equipment. Furthermore, their greasy nature requires special packaging materials to prevent the bleed-through of the fat to the outside of the package.

It is therefore an object of the present invention to provide a novel flavoring composition containing fat and seasoning ingredients which is light and fluffy, free-flowing, and not greasy to the appearance.

It is another object of the present invention to provide a process of making such a seasoning mix.

It has now been discovered that it is possible to produce a seasoning mixture of the type described above containing gelatinized starch flakes which permit the manufacture of a light and fluffy, free-flowing, and non-greasy seasoning composition. The gelatinized starch flakes are capable of holding large quantities of fat without appearing greasy. The ratio of fat to gelatinized starch flakes may be small if desired. However, since the gelatinized starch flakes are capable of carrying large quantities of fat, it is preferred to employ a relatively high ratio of fat to gelatinized starch flakes. Thus it is preferred to employ at least two parts of fat for each part of gelatinized starch flakes, and this ratio may go up as high as nine parts of fat per part of gelatinized starch flakes. In general, from two to six parts of fat per part of gelatinized starch flakes have been found highly desirable in seasoning compositions of the type herein described. Since the solid seasoning ingredients have some ability to absorb fat, it will be appreciated that the quantity of gelatinized starch flakes to be employed in the seasoning mix will depend to some extent upon the level of fat in the seasoning mix.

The starch employed in the present invention can be derived from a wide variety of sources. Thus wheat starch, corn starch, tapioca starch, arrowroot starch, waxy maize starch, and also chemically modified starch, such as acid modified starch, can be used with very desirable results. In addition, lower grade starches such as wheat starch containing an appreciable percentage of the protein of wheat, brewer's flakes, corn flour, wheat flour, including flour from soft wheat, flour from hard wheat, and flour from blended wheats, can be used with desirable results. In such materials which contain starch in addition to other constituents, the other constituents do not appear to affect materially the ability of the starch to act as a carrier. The quantity of such starch-bearing materials should, however, be increased to provide the required quantity of starch.

The starch can be gelatinized in any of the conventional manners. Typical of these operations is the drum drying of an aqueous slurry at atmospheric pressure under usual drum drying conditions. For example, a conventional starch gelatinization operation involves the use of a 10–20% solids starch slurry and a drum temperature equivalent to that of a steam pressure of 80–120 pounds per square inch. The gelatinized starch is taken off the drum in the form of flakes.

There is an unusual phenomenon observed in the present invention in that the ability of the gelatinized starch to act as a carrier is not correlated with the surface area of the starch. Thus, while it might be expected that extremely finely divided starch particles would be capable of carrying a larger percentage of fat per unit weight than would starch particles of larger size, such is not actually the case, and in fact, the contrary is actually observed. For example, starch flakes approximately $\frac{1}{1000}$ of an inch thick and having length and width dimensions of several inches are capable of carrying large quantities of fat without producing the appearance or feel of greasiness, while the same gelatinized starch, reduced to a finer state, can carry only a small part of the fat content of the larger flakes.

From a practical standpoint, little advantage is encountered in the use of such large flakes having linear dimensions of several inches as compared with the smaller flakes, since these tend to break up during the process of mixing the fat with the starch flakes. For the sake of uniformity, it is usually preferred to initially produce starch flakes somewhere near the size desired in the finished product and to use these flakes for incorporation with the fat. Thus it is preferred to employ flakes which pass through a No. 4 and which are retained on a No. 50 U.S. standard sieve. Materials which pass through a No. 50 sieve are decidedly less effective for the purpose, but can be tolerated where there is sufficient quantity of material which is retained on a No. 50 sieve.

This type of gelatinized starch flake product may be very readily produced by breaking up large gelatinized starch flakes in a hammer mill using a $\frac{1}{8}''$ or a $\frac{3}{16}''$ screen. It will be apparent that this method of preparation will result in a mixture which will contain a wide variety of particle sizes from $\frac{1}{8}''$ or from $\frac{3}{16}''$ down. This will include a certain amount of fine particles which are smaller than an optimum size. These smaller particles may be left in the mixture of starch flakes, but will be less efficient in absorbing fat than will the larger starch flakes. If desired, the mixture of starch flakes may be screened for the removal of these fines and the fines may be reprocessed to produce flakes of the desired dimension.

A preferred starch flake thickness is approximately $\frac{1}{1000}$ to $\frac{2}{1000}$ of an inch. This thickness may be varied from $\frac{1}{10000}$ to $\frac{1}{100}$ of an inch. At the lower portion of the thickness range, the flakes actually tend to be quite fragile and tend to break up somewhat during mixing operations. At the higher end of the scale the flakes are more sturdy mechanically but are less efficient per unit weight for carrying fat. A range of $\frac{5}{10000}$ to $\frac{5}{1000}$ of an inch would ordinarily cover the most desirable range of thickness.

The exact phenomenon which occurs in the present invention is not clearly understood. Apparently it is not a simple surface phenomenon inasmuch as the starch particles having the larger surface area are not the most efficient per unit weight. It is possible to postulate that the fat is both adsorbed and absorbed on the starch and that there is actually in the starch flakes some sort of cell structure created by the flaking operation which serves to carry substantial quantities of fat. Whatever the explanation of the phenomenon, the phenomenon itself has been definitely observed and the starch flakes are much more efficient in carrying the fat than is pulverized gelatinized starch.

Regardless of the manner in which the fat is carried by the starch, it is observed that the fat is liberated when the material is contacted with water. For example, when the starch product containing the fat is placed in water, it is observed that the starch becomes dispersed in the water, thereby liberating the fat. In the use of a soup mix the fat would be available for flavoring purposes and the starch would become dispersed in the aqueous phase, acting as a thickening agent.

The invention is applicable to fats in general having melting points of 130° F. or lower, including liquid oils. With fats melting over 130° F. the greasing problem is reduced considerably. Furthermore, in most instances in which a flavoring composition containing fat is employed, fats having melting points in excess of 130° F. have a tendency to solidify on the consumer's palate and are thus undesirable. The invention is thus applicable to solid and liquid animal and vegetable fats. Typical of the fats which can be employed are cottonseed oil, corn oil, soybean oil, either as oils or as hydrogenated fat. Since these products are usually bland in taste, it is preferred to employ them in conjunction with a flavored fat, of which the commonest example is chicken fat. The relative proportions of these various fats in the fat mixture can be varied widely depending upon the degree of flavoring desired.

In preparing the seasoning mixture, a variety of methods may be employed. For example, the gelatinized starch flakes and the fat may be made up into a premix by liquefying the fat and either pouring or spraying it over the starch flakes in a mixing device. Mixing is then continued for a period of time required to give more or less uniform distribution, which results in a product which is free-flowing and fluffy when cool. The solid seasoning ingredients may then be added to this premix and thoroughly blended therewith. As an alternative, the gelatinized starch flakes may be blended with the dry solid seasoning ingredients and the fat later blended into this preliminary mixture. It is also possible to mix the fat and the solid seasoning ingredients to produce a uniform blend, after which the gelatinized starch flakes may be worked into this blend.

*Example 1*

A blend of dry seasoning ingredients containing salt, sugar, monosodium glutamate, dehydrated onions, beans, parsley, sugar, turmeric, and a blend of spice flavorings was prepared. This blend of seasoning ingredients was mixed with starch flakes in the ratio of 4.9 pounds of starch flakes to 95.1 pounds of dry seasoning ingredients. This mixture was thoroughly blended, after which a blend of chicken fat and corn oil was added in the proportion of 22 parts of the fat mixture to 78 parts of the seasoning-starch mixture. The resultant mixture was thoroughly blended to yield a product which was light and fluffy, free-flowing, and non-greasy. The volume of 2½ pounds of this mix was 1600 cc. as compared with a volume of 1200 cc. for 2½ pounds of the same mix containing no gelatinized starch.

*Example 2*

Example 1 was duplicated with the exception that 9.8 pounds of starch were admixed with 90.2 pounds of seasoning ingredients. The product obtained was likewise light and fluffy, non-greasy, and free-flowing. The volume of 2½ pounds of this mix was 2500 cc. as compared with the 1200 cc. volume for the same mix without the gelatinized starch.

While various modifications of the invention have been described, it will be appreciated that other variations are possible without departing from the spirit thereof.

I claim as my invention:

1. A seasoning composition containing fat, seasoning, and gelatinized starch flakes, a major proportion of the starch being of a particle size larger than 50-mesh, the starch flakes having a thickness within the range of $\frac{1}{10000}$ to $\frac{1}{100}$ of an inch, the fat being present in the ratio of from 2 to 9 parts of fat per part of gelatinized starch flakes.

2. A soup flavoring composition comprising seasoning, a blend of vegetable fats and chicken fat, and gelatinized starch flakes, the fat constituents of the product being employed in the ratio of from 2 to 6 parts of fat per part of gelatinized starch flakes.

3. A soup flavoring composition comprising seasoning, a blend of chicken fat and corn oil, and gelatinized starch flakes, the blend of chicken fat and corn oil being employed in the proportion of from 2 to 6 parts per part of gelatinzed starch flakes.

4. A soup flavoring composition comprising seasoning, a blend of chicken fat and vegetable oil, and gelatinized starch flakes, the blend of chicken fat and vegetable oil being employed in the proportion of from 2 to 6 parts per part of gelatinized starch flakes.

JAMES W. EVANS.

References Cited in the file of this patent

UNITED STATES PATENTS

| Number | Name | Date |
| --- | --- | --- |
| 186,712 | Clotworthy | Jan. 30, 1877 |
| 1,324,538 | Boyles | Dec. 9, 1919 |
| 1,971,910 | Griffith | Aug. 28, 1934 |
| 2,170,954 | Stange | Aug. 29, 1939 |